United States Patent [19]

Clampitt et al.

[11] 3,727,687

[45] Apr. 17, 1973

[54] AQUEOUS GELS AND USES THEREOF

[75] Inventors: Richard L. Clampitt; James E. Hessert, both of Bartlesville, Okla.

[73] Assignee: Phillips Petroleum Company, Bartlesville, Okla.

[22] Filed: July 1, 1971

[21] Appl. No.: 159,052

[52] U.S. Cl. ............... 166/274, 166/275, 166/294, 166/305

[51] Int. Cl. .................................................. E21b 43/16

[58] Field of Search............... 166/268, 270, 273, 166/274, 275, 279, 294, 305; 257/316; 175/72

[56] References Cited

UNITED STATES PATENTS

| | | | |
|---|---|---|---|
| 3,208,524 | 9/1965 | Horner | 175/72 X |
| 3,265,657 | 8/1966 | Sinclair | 252/316 X |
| 3,455,393 | 7/1969 | Bradley | 166/305 R |
| 3,502,149 | 3/1970 | Pence | 166/294 X |
| 3,633,672 | 1/1972 | Smith | 166/279 |

*Primary Examiner*—Robert L. Wolfe
*Attorney*—J. Arthur Young et al.

[57] ABSTRACT

Improvements in secondary recovery operations for the recovery of oil, and improvements in well drilling operations, are accomplished through the use of aqueous mediums comprising new aqueous gels prepared from water and cellulose ethers.

25 Claims, No Drawings

AQUEOUS GELS AND USES THEREOF

This invention relates to new aqueous gels and uses thereof.

The secondary recovery of oil from oil-bearing or containing subterranean formations by fluid drive processes wherein a fluid is injected into the formation via one or more injection wells to drive the oil through the formation to one or more production wells is a well known process. Fluids used in such processes include liquids, such as water and various hydrocarbons, and gases such as hydrocarbon gases, carbon dioxide, etc. Many oil reservoirs comprise layers or zones or porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or another similar fluid of low viscosity can be used in the place of the ordinary drilling fluid or mud.

The present invention provides a solution for the above-described problems. We have now discovered a class of new aqueous gels which can comprise at least a portion of the aqueous medium used in said secondary recovery operations, and the aqueous medium used in said well drilling operations. We have discovered that water-soluble cellulose ethers when used in combination with a water-soluble compound of a polyvalent metal which can be reduced to a lower polyvalent valence state and a suitable reducing agent capable of reducing said polyvalent metal to said lower polyvalent valence state can be used as gelling agents to gel aqueous mediums comprising water. We have discovered that by varying the composition and/or amounts of said gelling agents, and/or the conditions under which they are used in forming the gels, a wide range of aqueous gels ranging from liquid highly mobile gels to rigid gels can be produced.

The aqueous gels of the invention are particularly useful in operations wherein a fluid medium is introduced into a borehole in the earth, e.g., in the above-described secondary recovery operations, in the above-described well drilling operations, in well completion operations, as packer fluids, etc.

Thus, according to the invention, there is provided, in a method wherein a fluid medium is introduced into a borehole in the earth and into contact with a subterranean formation penetrated by said borehole, the improvement wherein at least a portion of said fluid medium comprises an aqueous gel, and wherein said gel comprises water to which there has been added: a water thickening amount of a water-soluble cellulose ether; a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and an amount of a water-soluble reducing agent which is effective to reduce at least a portion of said metal to said lower valence state.

Further according to the invention, there is provided an aqueous medium, comprising water to which there has been added: a water thickening amount of a water-soluble cellulose ether; an amount of a water-soluble compound of a polyvalent metal wherein the valence state of the metal therein is capable of being reduced to a lower polyvalent valence state and which is sufficient to supply at least about $3 \times 10^{-6}$ gram atoms of said polyvalent metal per gram of said cellulose ether; and an amount of a water-soluble reducing agent which is effective to reduce at least a portion of said metal to said lower valence state.

Still further according to the invention, there is provided a composition, suitable for use as a gelling agent for water, comprising: a water-soluble cellulose ether; an amount of a water-soluble compound of a polyvalent metal wherein the valence state of the metal therein is capable of being reduced to a lower polyvalent valence state and which is sufficient to supply at least about $3 \times 10^{-6}$ gram atoms of said polyvalent metal per gram of said cellulose ether; and an amount of a water-soluble reducing agent which is effective to reduce at least a portion of said metal to said lower valence state when said composition is added to water.

Still further according to the invention, there is provided a method for producing an aqueous gel, which method comprises: thickening water by adding thereto a thickening amount of a water-soluble cellulose ether; and gelling the so-thickened water by adding thereto an amount of a water-soluble compound of a polyvalent metal wherein the valence state of the metal therein is capable of being reduced to a lower polyvalent valence state and which is sufficient to supply at least about $3 \times 10^{-6}$ gram atoms of said polyvalent metal per gram of said cellulose ether, and an amount of a water-soluble reducing agent which is effective to reduce at least a portion of said metal to said lower valence state.

In general, any of the water-soluble cellulose ethers can be used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequency, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in the practice of the invention can vary widely depending upon the viscosity grade and purity of the ether, and properties desired in the aqueous gels of the invention. In general, the amount of cellulose ether used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 40 ppm the viscosity increase is about 45 percent. At 100 ppm the viscosity increase is about 195 percent. Generally speaking, amounts in the range of from 0.0025 to 20, preferably from 0.01 to 5, more preferably 0.025 to 1, weight percent, based on the weight of water, can be used. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. If desired, said stiff gels can be "thinned" by dilution to any desired concentration of cellulose ether. This can be done by mechanical means, e.g., stirring, pumping, or by means of a suitable turbulence inducing device to cause shearing, such as a jet nozzle. Thus, there is really no fixed upper limit on the amount of cellulose ether which can be used. However, when a liquid mobile gel is desired, it is preferred to dilute the more concentrated gels before they become rigid.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gellation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.05 to 60, preferably 0.5 to 30, weight percent of the amount of the cellulose ether used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, we have discovered that when brines, such as are commonly available in producing oil fields, are used as the water in preparing gels in accordance with the invention, less of the starting polyvalent metal-containing compound is required than when distilled water is used. Stable gels have been prepared using brines having a wide range of dissolved solids content, e.g., from 850, 1,200, 6,000, and 90,000 ppm dissolved solids. Gellation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, and others; and nonsulfur-containing compounds such as hydroquinone, ferrous chloride, p-hydrozinobenzoic acid, hydrazine phosphite, hydrazine dichloride, and others. Some of the above reducing agents act more quickly than others, for example, sodium thiosulfate usually reacts slowly in the absence of heat, e.g., requiring heating to about 125°–130° F. The presently most preferred reducing agents are sodium hydrosulfite or potassium hydrosulfite.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels of the invention. Either the metal-containing compound or the reducing agent can be first added to a solution of the cellulose ether in water or other aqueous medium, or said metal-containing compound and said reducing agent can be added simultaneously to the solution or aqueous medium containing the cellulose ether. Generally speaking, where convenient, the preferred method is to first disperse the cellulose ether in the water or other aqueous medium. The reducing agent is then added to the dispersion of cellulose ether, with stirring. The metal-containing compound is then added to the solution or aqueous medium containing the cellulose ether and the reducing agent, with stirring. Gellation starts as soon as reduction of some of the higher valence metal in the starting polyvalent metal-containing compound to a lower valence state occurs. The newly-formed lower valence metal ions, for example +3 chromium obtained from +6 chromium, effect rapid crosslinking of the cellulose ethers and gellation of the solution or aqueous medium containing same.

It is also within the scope of the invention to prepare a dry mixture of the cellulose ether, the metal-containing compound and the reducing agent, in proper proportions, and then add this dry mixture to the proper amount of water.

An advantage of the invention is that ordinary ambient temperatures and other conditions can be used in practically all instances in preparing the aqueous gels of the invention or aqueous mediums containing same. However, in some instances, a small amount of heat may be desirable to aid in the formation of the gel, e.g., heating to a temperature of about 125°–130° F.

Aqueous gels in accordance with the invention can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of the cellulose ether, the type and amount of starting polyvalent metal compound used, and the type and amount of reducing agent used.

One presently preferred procedure is to prepare a relatively concentrated or high viscosity gel and dilute same to a viscosity or concentration suited for the actual use of the gel. In many instances, this procedure results in a more stable gel.

When employing said dilution technique a starting solution of cellulose ether containing, for example, 1,000 to 10,000 ppm (0.1 to 1 wt. percent) of cellulose ether can be used. This solution is then gelled by the addition of suitable amounts of polyvalent metal compound and reducing agent. After gellation has proceeded to the desired extent, the resulting gel can be diluted to the concentration or viscosity most suited for its intended use. For example, if the gel is to be used in a waterflood operation, it could be diluted to a nominal 1,000, 500, 250, or less, ppm gel by the addition of a suitable amount of water. The more concentrated cellulose ether solutions usually have a faster rate of gellation. Thus, in most instances, it will be preferred to carry out the dilution soon after the components of the gel have been added to the water or other aqueous medium, e.g., within about 5 to 30 minutes. Preferably, the concentration of the cellulose ether in the "concentrated gel" will be at least twice that in the final gel. Dilution of the gel retards the rate of gellation. Thus, this dilution technique can be employed to control the gellation rate, if desired. In many instances, gels prepared by employing said dilution technique are more stable. Another advantage of said dilution technique is that it is usually more convenient to weigh out and handle the larger quantities of reagents.

We are aware that chromium ions having a valence of +3 have been used to react with water-dispersible polymers such as polyacrylamides and polysaccharides. See, for example, U.S. Pat. No. 3,114,651 to Gentile and U.S. Pat. No. 3,383,307 to Goetz. In such processes the chromium compound is added in a form wherein the chromium has an initial valence of +3, e.g., $CrCl_3$, $Cr(NO_3)_3$, etc. We have found that thus-obtained $Cr^{+3}$ ions do not produce stable gels with cellulose ethers. The gels so produced either undergo syneresis or precipitation with a few minutes. In the practice of the present invention, the $Cr^{+3}$ ions must be newly formed, e.g., nascent ions formed in situ in the solution to be gelled.

Gel instability is evidenced by precipitation and/or syneresis (bleeding or water separation). A severe test of gel stability is to prepare the gel and merely allow it to stand. We have found that gels which are stable for as long as 48 hours are usually stable for a month or longer. We have also found that formation solids such as sandstone and limestone promote gel stability.

Generally speaking, the pH of the final solution of the gelling reagents is preferably less than 7, more preferably in the order of 6. In general, pH is not controlling, but higher pH values retard gellation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels of the invention are defined for convenience, and not by way of limitation, in terms of the amount of cellulose ether contained therein, irrespective of whether or not all the cellulose ether is cross-linked. For example, a 1 weight percent or 10,000 ppm gel is a gel which was prepared from a starting cellulose ether solution which contained 1 weight percent or 10,000 ppm by weight of cellulose ether. The same system is employed for the gels prepared by the above-described dilution technique.

As indicated above, the aqueous gels of the invention are particularly useful in fluid drive operations for the secondary recovery of oil. The gels of the invention are applicable to decreasing the mobility of a drive fluid, such as water, or decreasing the permeability of formations prior to or during secondary recovery operations, such as fluid drive processes, and also for water shutoff treatments in producing wells. In one embodiment of the invention, a conventional waterflood or gas drive is carried out in conventional manner until the drive fluid breaks through into the production well in excessive amounts. A gel of the invention is then pumped down the well and into the formation in any suitable manner, any suitable amount, and for any desired period of time sufficient to obtain the desired in-depth penetration and decrease in mobility of the drive fluid, or decrease in permeability of the high permeability zones of the formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a gel in accordance with the invention over a suitable period of time ranging from one day to six months. Or, the injection of the gel can be carried out by injecting a slug of about 200 to 5,000 barrels of gel into the well and then into the formation. Injection in one of the above manners will provide a flood front adjacent the oil to be produced. If desired, an ordinary brine or water can then be employed to drive this slug or band or front of gel on through the formation to the production well. If desired, in order to avoid any sharp demarcations in viscosity or mobility of the gel, which could adversely affect the relative mobility of the flood medium and the oil, and cause channeling, the viscosity or concentration of the gel can gradually be lessened through a series of incremental decreases rather than discontinuing the injection thereof abruptly.

In another embodiment of the invention, the formation can be treated prior to carrying out the fluid drive secondary recovery operations. This embodiment is particularly applicable where there is a good knowledge of the nature of the formation. Thus, in a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing wells, ether oil wells or gas wells, where there is a more porous nonhydrocarbon-bearing strata. For example, such a condition can exist where there is a water sand adjacent the hydrocarbon-bearing sand and the water intrudes into the borehole and interferes with the production of hydrocarbon. In such instances, the formation can be treated in accordance with the invention to shut off the flow of water. The method of carrying out such a water shutoff treatment is substantially the same as described above in connection with fluid drive operations.

It is also within the scope of the invention to carry out the gel injection techniques of the invention periodically or intermittently, as needed, during the course of a fluid drive secondary operation, or during the production of oil from a producing well.

In all of the above operations, the injection of the gel of the invention can be carried out in conventional manner. If desired, a gel of suitable viscosity or concentration can be injected as the drive fluid per se. Gels injected in accordance with the invention can be prepared in advance, stored in suitable tanks, and then pumped into the well. Or, said gels can be formed in a conduit leading to the injection well, or in the tubing in the well itself, and then injected into the formation. Thus, the required amounts of cellulose ether, polyvalent metal compound, and reducing agent can be metered into the tubing in the well, mixed therein, and then injected into the formation. If desired, selected portions of the formation can be isolated mechanically, as by the use of packers, and other means known to the art, for treatment in accordance with the invention.

The aqueous gels of the invention can comprise, or can be employed as, drilling fluids in the drilling of wells in any manner known to the art for the use of drilling fluids. Such gels can be employed without the addition of other materials thereto. However, if desired, weighting agents such as barium carbonate, barium sulfate, amorphous silica, etc., can be included in the drilling fluids comprising said aqueous gels. If desired, other additives compatible with the aqueous gels can also be included in the drilling fluid. Thus, the drilling fluids can include clays such as bentonite, attapulgus clay, fluid loss agents, etc. It should be understood that not all of these additives or constituents will necessarily be present in any one drilling fluid and that the amount of any particular additive used will be governed by the other constituents present under the particular well conditions existing. As indicated, in selecting such additives for use in a particular drilling fluid, care should be taken to avoid materials which are not compatible with the aqueous gels. The use of such additives will be governed in part by the viscosity and fluid loss properties desired in the drilling fluid. Thus, as is the situation in connection with conventional drilling fluids, pilot tests should be run to determine the properties desired for the aqueous gel used as the drilling fluid, or an aqueous gel containing one of the above-described additives, to determine the optimum results or properties desired for the drilling fluid under the particular well conditions existing.

The following examples will serve to further illustrate the invention.

EXAMPLE I

A series of runs was made to illustrate the formation of aqueous gels in accordance with the invention. For these runs a stock solution containing 1.5 pounds per barrel of high viscosity CMC-9 was prepared. To individual 233 ml portions of this stock solution there were added varying amounts of $Na_2S_2O_4$, dissolved in 27 ml of distilled water, with stirring for 10 seconds; and then varying amounts of $Na_2Cr_2O_7 \cdot 2H_2O$, dissolved in 20 ml of distilled water, with stirring for 10 minutes. Each test run solution thus had a total volume of 280 ml and the concentration of CMC therein was 1.25 pounds per barrel or 0.357 weight percent (3,570 ppm). Stable gels were formed in each instance. The results of these test runs are set forth below.

| $Na_2Cr_2O_7 \cdot 2H_2O$ grams | $Na_2S_2O_4$ grams | Gel Strength 10 sec/10 min. (lbs/100 ft²) Initial | Aged 3 hours | Aged 3 days |
|---|---|---|---|---|
| 0.0 | 0.0 | 1/1 | | 1/1 |
| 0.05 | 0.20 | 0/0 | 0/0 | 2/8 |
| 0.05 | 0.25 | 2/1 | 0/2 | 15/44 |
| 0.10 | 0.25 | 0/0 | 1/2 | 7/25 |
| 0.10 | 0.30 | 1/1 | 1/1 | 12/17 |
| 0.15 | 0.30 | 0/0 | 15/35 | 8/8 |
| 0.20 | 0.15 | 0/0 | 1/1 | 0/3 |
| 0.20 | 0.25 | 2/1 | 2/1 | 6/19 |
| 0.20 | 0.30 | 10/63 | 23/39 | 7/7 |

The above data indicate that with increasing amounts of $Na_2Cr_2O_7 \cdot 2H_2O$, with sufficient reducing agent present to reduce $Cr^{+6}$ to $Cr^{+3}$, the rate of gellation increases. The data also indicate that for a given amount of $Na_2Cr_2O_7 \cdot 2H_2O$, as the amount of reducing agent present increases, the rate of gellation increases.

EXAMPLE II

A series of test runs was carried out to investigate the order of addition of the metal-containing compound and the reducing agent to the cellulose ether solution. A solution containing 0.357 weight percent (3,570 ppm) of high viscosity CMC-9 is distilled water was prepared. The order of addition of metal compound (M) and reducing agent (RA) was varied in three ways: (1) M first, with RA second (M-RA); (2) RA first, with metal second (RA-M); and (3) RA and M together (RA 8M). The metal compound and/or reducing agent were added in solution form in amounts sufficient to supply 0.16 gram of each per 280 ml total final solution volume. Gel formation was measured by determining apparent viscosity and gel strengths on the resulting gels. The results of these tests are set forth below along with comparable tests on the ungelled CMC solution.

| | Time Aged at Room Temp., hrs. | Apparent Vis., cp[1] | Gel Strength[1] 10 sec./10 min. |
|---|---|---|---|
| Ungelled CMC | 0 | 22.5 | 1/2 |
| | 5 | 21 | 1/1 |
| | 72 | 21 | 0/0 |
| Gelled CMC (M-RA) | 0 | 47.5 | 30/12 |
| | 5 | 150+ | 22/30 |
| | 72 | | |
| Gelled CMC (RA-M) | 0 | 7 | 0/0 |
| | 5 | 14 | 3/10 |
| | 72 | 51.5 | 11/15 |
| Gelled CMC (RA & M) | 0 | 12 | 2/2 |
| | 5 | 13 | 1/1 |
| | 72 | 70 | 19/33 |

(1) Model 35, Fann VG meter.

The above data show that good gels were obtained in all instances and that the order of addition of the reducing agent and the metal-containing compound to the CMC solution can be varied as desired. The data also indicate that better control of gelling rate is obtained when the reducing agent is added first.

EXAMPLE III

A series of test runs was made to check the gelling properties of water-soluble cellulose ethers other than CMC. In each test run a 1.0 weight percent (10,000 ppm) solution in distilled water of the cellulose ether to be tested was prepared. To 250 ml of each such solution there was then added 0.375 gram of $Na_2S_2O_4$ and 0.375 gram of $Na_2Cr_2O_7 \cdot 2H_2O$ (each in solutions containing 1.5 grams per liter), in that order, with stirring after each addition. The solutions were then examined visually for gel formation. Results of the tests were as follows:

| Cellulose Ether | Result |
|---|---|
| Methyl Cellulose | positive - gel formation |
| Hydroxypropyl cellulose | " |
| Hydroxyethyl cellulose | " |
| Carboxymethyl hydroxyethyl cellulose | " |

Results of other gelling tests have shown that CMC-7 and CMC-12, as well as CMC-9, form good stable gels in accordance with the invention.

EXAMPLE IV

A series of test runs was made to check the effectiveness of various reducing agents for reducing hexavalent chromium to trivalent chromium. In each test run a test tube was half-filled with a 1.0 weight percent (10,000 ppm) $Na_2Cr_2O_7 \cdot 2H_2O$ solution. To this solution there was added a small amount of reducing agent. If the solution changed from orange color ($Cr^{+6}$) to green color ($Cr^{+3}$) within 30 minutes, the material was considered an effective reducing agent. Effective sulfur-containing reducing agents included: sodium sulfide, sodium hydrosulfite, sodium metabisulfite, potassium sulfite, sodium bisulfite, potassium metabisulfite, sodium sulfite, sodium thiosulfate (with small amount of heat), ferrous sulfate, and thioacetamide + sulfuric acid. Effective nonsulfur-containing reducing agents included: hydroquinone, ferrous chloride, sodium nitrite, p-hydrazinobenzoic acid, hydrazine phosphite, and hydrazine dihydrochloride.

EXAMPLE V

A selected few of the effective reducing agents from Example IV were used with $Na_2Cr_2O_7 \cdot 2H_2O$ to gel CMC solutions in a series of test runs. In each test run 1.6 grams of high viscosity CMC-9 was added to 280 ml of distilled water to give a solution containing 0.57 weight percent or 5,700 ppm of CMC. To each such solution there was then added 0.5 gram of the reducing agent and 0.5 gram of $Na_2Cr_2 \cdot 5H_2O$, in 10 weight percent solutions, in that order, with stirring. The solutions were then examined visually for gel formation. Results of the tests were as follows:

| Reducing Agent | Results |
|---|---|
| Thioacetamide + sulfuric acid | positive - gel formation |
| Sodium bisulfite | " |
| Ferrous chloride | " |
| Hydrazine phosphite | " |

Results of other similar tests gave positive results, i.e., gel formation, when hydroquinone was used as a reducing agent for $Na_2Cr_2O_7 \cdot 2H_2O$.

EXAMPLE VI

Two sample solutions containing 0.357 weight percent (3,570 ppm) of high viscosity CMC-9 in distilled water were prepared. Sample No. 1 was prepared using 0.32 gram of $Na_2S_2O_4$ and 0.32 gram of $Na_2Cr_2O_7 \cdot 2H_2O$, each in solution in distilled water. The total volume of the thus-prepared sample solution was 280 ml. Sample No. 2 was prepared using 0.68 gram of $CrCl_3$ in solution in distilled water. The total volume of the thus-prepared sample solution was 280 ml. The gel resulting from Sample No. 1, using $Cr^{+6}$, was still a stable gel after 7 days. The gel resulting from Sample No. 2, using $Cr^{+3}$, was unstable and underwent syneresis within 10 minutes after mixing.

EXAMPLE VII

Potassium permanganate and sodium permanganate were each used, along with sodium hydrosulfite, to gel a solution containing 0.357 weight percent (3,570 ppm) of high viscosity CMC-9 in brine containing 1200 ppm dissolved solids. To one 250 ml sample of said CMC solution there was added 0.375 gram of $KMnO_4$ (3.75 ml of 10 weight percent solution in distilled water), and 0.375 gram of $Na_2S_2O_4$ (3.75 ml of 10 weight percent solution), with stirring after each addition. The resulting gel had properties similar to gels prepared from like CMC solutions using substantially equivalent amounts of $Na_2Cr_2O_7 \cdot 2H_2O$ and $Na_2S_2O_4$. Another gel was prepared in the same manner using $NaMnO_4$. The resulting gel had properties similar to the gel prepared using $KMnO_4$.

EXAMPLE VIII

A dry blend of 1 part by weight of high viscosity CMC-9, 0.28 part by weight of $Na_2Cr_2O_7 \cdot 2H_2O$, and 0.28 part by weight of $Na_2S_2O_4$ was prepared. This dry blend was added to a sufficient quantity of an oil field brine containing approximately 850 parts per million of dissolved solids to form a solution which contained 1,000 parts per million of CMC (0.1 weight percent), AND STIRRED -) MINUTES ON A HIGH SPEED MIXER. The resulting aqueous gel had an apparent viscosity of 4.5 cp approximately 15 minutes after said mixing Approximately 6 hours later, the apparent viscosity was 7.5 cp. Approximately 24 hours after mixing, the apparent viscosity of a retain sample was 9.0 cp. Said apparent viscosities were run on a Fann VG meter (300 rpm).

A solution of said high viscosity CMC-9 containing 1,000 parts per million of ungelled CMC (0.1 weight percent) was also prepared using the same oil field brine. Another essentially identical solution of the same CMC had an apparent viscosity of 4.0 cp. (Fann VG meter, 300 rpm).

A linear displacement model (sand pack) was prepared as follows. A steel pipe 72 inches long having an I.D. of 0.75 inch was filled with Mill Crrek sand. The filled pipe was then evacuated to remove air. The evacuated pipe was then flooded with $CO_2$ gas to further remove any air. The pipe was then again evacuated. The pipe was then flooded with water from the bottom so as to remove all traces of gas therefrom. The column was then flooded from the top with an oil having a viscosity of 210 centipoises at 75° F. so as to establish an oil saturation and residual connate water saturation condition. The column was then water flooded with the above-described oil field brine from the top for a sufficient period of time to give an exit water-to-oil ratio in excess of 100:1, and thus insure that all mobile oil had been removed therefrom. The column was then considered to be residual oil saturated.

The thus-prepared linear displacement model had a pore volume of 195 milliliters, a porosity of 42.8 percent, and a residual oil saturation (Sor) of 0.298. The column was mounted in a vertical position and provided with pressure taps at the following locations, measured from the top: 0 inches, 12 inches, 36 inches, 60 inches, and 72 inches. Water diversion tests were then carried out as described below, with all liquids being pumped into the top of the column. By thus flooding the column in a downward direction, no parting or fluidizing action of the bed occurs due to the lifting effect of the liquids introduced thereinto.

In making water diversion tests using the above-described column, the various liquids are pumped into the column at uniform rates and pressure readings are taken at selected pressure taps along the column. The data thus obtained are employed to calculate mobility values using Darcy's linear flow equation. Said equation may be written as follows:

$$K/\mu = QL/A\Delta P$$

wherein the factor $K/\mu$ represents mobility in millidarcys divided by the viscosity of the liquid, Q represents flow rate in cubic centimeters per second, L represents the length of the column in centimeters, A represents cross-sectional area of the column in square centimeters, and $\Delta P$ represents the differential pressure in atmospheres. Since L and A are constant for any given model, mobility can be readily calculated from $Q/\Delta P$. If desired, in employing the data, mobility values can be plotted as the ordinate versus cumulative volume injected as the abscissa.

In this example, mobility tests were carried out by first introducing a total of 600 milliliters of said oil field brine at a uniform rate such that the velocity through the column was 100 feet per day. Next, a total of 250 milliliters of the above-described ungelled CMC solution containing 1,000 ppm (0.1 weight percent) of CMC was introduced at the same rate. This was followed by the injection of another 1,600 milliliters of said brine at the same rate. Next, 200 milliliters of the above-described gelled CMC solution containing 1,000 ppm (0.1 weight percent) of CMC was introduced at the same rate. This was followed by 2,350 milliliters of said brine at the same rate. Throughout the introduction of said liquids, pressure readings were taken at the entrance to the column, a point 12 inches from the entrance, a point 36 inches from the entrance, and at the outlet of the column. Mobility values, $K/\mu$, for each liquid were calculated from said injection rate and the pressure readings, as described above. Results for the entire length of the column are set forth in Table III below, and results for the second section of the column, i.e., the section between 12 inches and 36 inches from the entrance to the column, are set forth in Table IV below.

TABLE III

| Liquid Injected | Cumulative Slug Vol. of Liquid Injected - ml. | Total Cumulative Vol. of Liquid Injected - ml. | Mobility (K/μ) md/cpRRF | |
|---|---|---|---|---|
| Brine | | | | |
| | 450 | 450 | 4200 | |
| | 550 | 550 | 4200 | |
| | 600 | 600 | 4200 | 1.0 |
| Ungelled CMC Soln. | | | | |
| | 100 | 700 | 1150 | |
| | 200 | 800 | 1250 | |
| | 250 | 850 | 1250 | 3.4 |
| Brine | | | | |
| | 100 | 950 | 2300 | |
| | 200 | 1050 | 3900 | |
| | 1600 | 2450 | 3600 | 1.17 |
| Gelled CMC Soln. | | | | |
| | 50 | 2500 | 740 | |
| | 150 | 2600 | 200 | |
| | 200 | 2650 | 35 | 120 |
| Brine | | | | |
| | 100 | 2750 | 130 | |
| | 200 | 2850 | 155 | |
| | 350 | 3000 | 200 | |
| | 450 | 3100 | 310 | |
| | 550 | 3200 | 350 | |
| | 650 | 3300 | 370 | |
| | 750 | 3400 | 380 | |
| | 850 | 3500 | 390 | |
| | 1350 | 4000 | 430 | |
| | 1850 | 4500 | 425 | |
| | 2350 | 5000 | 425 | 9.8 |

TABLE IV

| Liquid Injected | Cumulative Slug Vol. of Liquid Injected - ml. | Total Cumulative Vol. of Liquid Injected - ml. | Mobility (K/μ) md/cpRRF | |
|---|---|---|---|---|
| Brine | | | | |
| | 450 | 450 | 4200 | |
| | 550 | 550 | 4200 | |
| | 600 | 600 | 4200 | 1.0 |
| Ungelled CMC Soln. | | | | |
| | 200 | 800 | 1250 | |
| Brine | | | | |
| | 150 | 1000 | 4300 | |
| | 650 | 1500 | 4500 | |
| | 1150 | 2000 | 4500 | |
| | 1600 | 2450 | 4500 | 0.93 |
| Gelled CMC Soln. | | | | |
| | 50 | 2500 | 740 | |
| | 150 | 2600 | 200 | |
| | 200 | 2650 | 75 | 56 |
| Brine | | | | |
| | 100 | 2750 | 200 | |
| | 200 | 2850 | 240 | |
| | 350 | 3000 | 250 | |
| | 450 | 3100 | 300 | |
| | 550 | 3200 | 325 | |
| | 650 | 3300 | 350 | |
| | 750 | 3400 | 380 | |
| | 850 | 3500 | 400 | |
| | 1350 | 4000 | 430 | |
| | 1850 | 4500 | 450 | |
| | 2350 | 5000 | 475 | 8.8 |

Referring to Table III, the mobility of the brine in the column initially was 4200 millidarcys per centipoise. The mobility of the ungelled CMC solution at the end of the injection thereof was 1250 millidarcys per centipoise. The mobility of the second brine injection increment increased from 2300 initially to 3600 finally, showing that the brine was eluting or washing out the previously injected ungelled CMC, and that said ungelled CMC was largely ineffective in reducing the permeability of the column and/or decreasing the mobility of the brine. The mobility of the gelled CMC solution decreased from 740 millidarcys per centipoise initially to 35 millidarcys per centipoise finally, indicating that the gelled CMC solution could be used to essentially block or plug the column, if desired. The mobility of the final slug of brine injected increased from 130 millidarcys per centipoise initially (first 100 ml.) to a stabilized value in the order of 425 millidarcys per centipoise, showing that the gelled CMC solution had effectively reduced the permeability of the column and/or the mobility of the brine. From this example, it is evident that the gelled CMC solution could be employed to selectively reduce the permeability of the more porous sections of a formation and thus divert flood water to the less porous sections of a formation. This is possible because the gelled CMC solution will preferentially enter said more porous sections of the formation.

Referring to Table IV, similar comparisons can be developed from the data there shown. The outstanding feature of the data in Table IV is that said data show that the second slug of brine, injected following the ungelled CMC solution, completely removed the ungelled CMC solution because the mobility of the second slug of brine was slightly greater than the initial mobility of the first slug of brine. The data show there was no residual effect in the column from the ungelled CMC solution.

EXAMPLE IX

An aqueous gel in accordance with the invention was prepared from a solution which initially contained 100 parts per million of CMC (0.01 weight percent). Said gel was prepared by adding 10 grams of CMC to 1 liter of Bartlesville tap water. To this solution there was then added, with mixing, sufficient sodium hydrosulfite to give 0.2 gram per liter. To the resulting mixture there was then added sufficient sodium dichromate to give 0.15 gram per liter, with mixing. The resulting gel was a nominal 10,000 ppm CMC gel (1.0 weight percent CMC). This gel was then diluted with sufficient water to give a nominal 100 ppm CMC gel (0.01 weight percent CMC).

Said nominal 100 ppm CMC gel was then used to carry out water diversion tests in a linear displacement model (sand pack) prepared essentially as described above in Example III. The linear displacement model used had a pore volume of 194 milliliters, a porosity of 42.6 percent, and a residual oil saturation (Sor) of 0.088.

Mobility tests were then carried out by first introducing a total of 2600 milliliters of said oil field brine at a rate such that the velocity through the column was about 125 feet per day. Next, a total of 4800 milliliters of said nominal 100 ppm CMC gel was introduced at the same rate. This was followed by 1500 milliliters of said oil field brine at the same rate. Throughout the introduction of said liquids, pressure readings were taken at the entrance to the column and a point 12 inches from the entrance to the column to measure the pressure differential across the 12-inch section of the column. Mobility, $K/\mu$ of each liquid, was calculated from said injection rate and said pressure readings, as described above in Example III. The results are set forth in Table V below.

TABLE V

| Liquid Injected | Cumulative Slug Vol. of Liquid Injected - ml. | Total Cumulative Vol. of Liquid Injected - ml. | Mobility $(k/\mu)$ md/cp | RRF |
|---|---|---|---|---|
| Brine | 2600 | 2600 | 5800 | 1.0 |
| Gelled CMC | 100 | 2700 | 1400 | |
| | 300 | 3000 | 1150 | |
| | 800 | 3500 | 580 | |
| | 1300 | 4000 | 280 | |
| | 1800 | 4500 | 170 | |
| | 2300 | 5000 | 115 | |
| | 2800 | 5500 | 82 | |
| | 3300 | 6000 | 64 | |
| | 3800 | 6500 | 53 | |
| | 4300 | 7000 | 50 | |
| | 4800 | 7500 | 50 | 116 |
| Brine | 500 | 8000 | 40 | |
| | 1000 | 8500 | 40 | |
| | 1500 | 8500 | 40 | 145 |

The data in Table V show that the initial mobility of the brine in the column was 5800 millidarcys per centipoise. During the injection of the gelled CMC solution the mobility thereof decreased from 5800 to 50 millidarcys per centipoise at which time it had become stabilized, showing that the permeability of the column had become stabilized or essentially constant. After about 4800 milliliters of the gelled CMC solution had been injected, the injection thereof was discontinued and injection of said brine was resumed. The data show that the mobility of the brine in the treated sand packed column was stabilized at 40 millidarcys per centipoise. The residual resistance factor was 145. Said residual resistance factor shows that the sand pack treated with the nominal 100 ppm gel of CMC was 145 times more resistant to the flow of the brine through the pores thereof after treatment with the gelled CMC solution.

Previous tests had shown that a 100 ppm solution of ungelled CMC has a viscosity approximately the same as that of said nominal 100 ppm CMC gel and that said ungelled CMC solution produced a residual resistance factor which was usually less than about 5. The above Example IX shows that very dilute aqueous gels of CMC in accordance with the invention can be effectively employed to reduce the permeability of porous formations.

EXAMPLE X

Another mobility test run was carried out employing a core of Burbank sandstone from the Burbank Field, Oklahoma, containing residual oil, and an aqueous gel in accordance with the invention which contained 500 ppm of high viscosity CMC-9. Said mobility test run was carried out in a manner similar to that employed in Examples VIII and IX by first injecting a slug of the oil field brine, then injecting a slug of said aqueous gel containing 500 ppm of CMC, and then injecting another slug of said brine. The results of the test run show that said aqueous gel reduced the mobility of the brine from 720 millidarcys per centipoise to 1.7 millidarcys per centipoise. The resulting residual resistance factor was approximately 430.

EXAMPLE XI

This example illustrates the utility of the aqueous gels of the invention as drilling fluids. Three drilling fluids were prepared and the viscosities thereof adjusted to be essentially the same at a shear rate of 511 reciprocal seconds (300 rpm on a Model 35, Fann VG meter). Thus, the viscosity behavior of all three fluids could be compared at shear rates above and below 511 reciprocal seconds. Each of said fluids was prepared by sifting the dry components thereof into 280 ml of distilled water while stirring at low speed on a Hamilton Beach malt mixer. All fluids were then stirred 10 minutes with a Multimixer. The viscosities were then adjusted by dilution with water to be essentially the same as the viscosity of the lowest viscosity fluid. Final compositions of the fluids were as follows:

A. Dispersed bentonite fluid — 30.4 ppb (pounds per barrel) of bentonite, 3.04 ppb of ferrochrome lignosulfonate, and 0.76 ppb NaOH in distilled water.

B. High viscosity CMC-9 fluid — 1.21 ppb of said CMC in distilled water.

C. Gelled high viscosity CMC-9 fluid — 0.98 ppb of said CMC, 0.24 ppb of $Na_2Cr_2O_7 \cdot 2H_2O$, and 0.24 ppb of $Na_2S_2O_4$ in distilled water. This gel thus contained 0.28 weight percent or 2800 ppm of said CMC.

Viscosity values at different shear rates, pH, and water loss were then determined on each of the three fluids. The results of these tests are set forth in Table VI below.

TABLE VI

Apparent viscosity, cp. v. shear rate*

| Fluid | Shear rate, $sec^{-1}$ | 1022 | 511 | 341 | 170 | 10.2 | 5.1 | pH | Water loss ml/30 min. |
|---|---|---|---|---|---|---|---|---|---|
| | Fann, RPM | 600 | 300 | 200 | 100 | 6 | 3 | | |
| A | | 57 | 66 | 72 | 78 | 100 | 100 | 11.2 | 6.6 |
| B | | 45.5 | 66 | 81 | 114 | 300 | 300 | 8.9 | 165 |
| C | | 46 | 66 | 84 | 123 | 650 | 1100 | 6.2 | 35 |

*Fann Apparent Viscosity = 300 × deflection (direct reading)/rpm; for spring constant F = 1, and R1-B1 rotor-bob combination — standard for drilling fluid testing.

Fann VG meter constants for Model 35:
 Shear stress, dynes/cm² = 5.077 times deflection
 Shear rate, reciprocal seconds = 1.704 times rpm $$\text{Apparent viscosity, cp.} = \frac{\text{Shear stress, dynes/cm.}^2}{\text{Shear rate, sec.}^{-1}}$$

Plotting shear stress v. shear rate, or Fann reading v. Fann rpm, for said drilling fluids A, B, and C shows that fluids A and B are pseudoplastic, i.e., the curve goes through the origin at zero shear rate (or rpm); whereas the gelled CMC fluid behaves like a Bingham plastic fluid at low shear rates and has a true yield point of about 9 (Y axis intercept when plotting shear stress or Fann reading on the Y axis).

It will be noted the gelled CMC drilling fluid (C) had a lower viscosity at the higher shear rate (600 rpm) than the bentonite drilling fluid; and a higher viscosity at the lower shear rates (100, 6, and 3 rpm) than either of fluids A and B. This property will facilitate penetration of the drilling bit and yet permit excellent suspension of solids in the annulus for cleaning of the borehole. Penetration rate is normally considered an inverse function of apparent viscosity at high shear conditions. Thus, the gelled CMC drilling fluids of the invention will permit higher drilling rates than the ordinary bentonite drilling fluids. The gelled CMC drilling fluid provides water loss control, 35 ml in 30 minutes; whereas the ungelled CMC drilling fluid had a water loss of 165 ml in 30 minutes. This later value is considered "no control" in the drilling fluid art. Thus, the results obtained with the gelled CMC drilling fluid were surprising in that it (1) behaves as a pseudoplastic at moderate to high shear rates, (2) behaves as a Bingham plastic at low shear rates, and (3) provides water loss control.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. In a method wherein a fluid medium is introduced into a borehole in the earth and into contact with a subterranean formation penetrated by said borehole, the improvement wherein at least a portion of said fluid medium comprises an aqueous gel, and wherein said gel comprises water to which there has been added:
 a water thickening amount of a water-soluble cellulose ether;
 a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and
 an amount of a water-soluble reducing agent which is effective to reduce at least a portion of said metal to said lower valence state.

2. A method according to claim 1 wherein the amount of said water-soluble polyvalent metal compound is an amount sufficient to supply at least $3 \times 10^{-6}$ gram atoms of said metal capable of being reduced to said lower polyvalent valence state.

3. A method according to claim 1 wherein said aqueous gel comprises water to which there has been added:
 from 0.0025 to 20 weight percent of said cellulose ether, based upon the weight of said water;
 from 0.05 to 60 weight percent of said polyvalent metal compound based upon the weight of said cellulose ether; and
 from 0.1 to at least about 200 percent of the stoichiometric amount of said reducing agent required to reduce said polyvalent metal to said lower polyvalent valence state.

4. A method according to claim 1 wherein said cellulose ether is a carboxymethyl cellulose ether.

5. A method according to claim 2 wherein said compound of a polyvalent metal is a compound of chromium wherein the valence of the chromium is +6 and the valence of at least a portion of said chromium is reduced to +3.

6. A method according to claim 5 wherein said chromium compound is selected from the group consisting of ammonium chromate, ammonium dichromate, the alkali metal chromates and dichromates, chromium trioxide, and mixtures thereof.

7. A method according to claim 6 wherein said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

8. A method according to claim 3 wherein:
 said cellulose ether is sodium carboxymethyl cellulose;
 said polyvalent metal compound is sodium dichromate; and
 said reducing agent is sodium hydrosulfite.

9. A method according to claim 1 wherein:
 said borehole comprises an injection well;
 said formation comprises an oil-bearing formation and is also penetrated by a production well;
 said method is a fluid drive process carried out for the recovery of oil from said formation by injecting a drive fluid into said formation via said injection well and driving oil to said production well; and
 said fluid medium comprising said aqueous gel is introduced into said injection well and into the pores of said formation.

10. A method according to claim 9 wherein:
 said formation is of nonuniform permeability and comprises at least one zone of relatively high permeability and at least one zone of relatively low permeability; and
 said fluid medium is injected into said formation prior to injecting drive fluid into said formation via said injection well in said fluid drive process for driving said oil to said production well.

11. A method according to claim 10 wherein said aqueous gel comprises water to which there has been added:
 from 0.025 to 1 weight percent of said cellulose ether, based upon the weight of said water;
 from 0.5 to 30 weight percent of said polyvalent metal compound based upon the weight of said cellulose ether; and
 from 0.5 to at least about 150 percent of the stoichiometric amount of said reducing agent required to reduce said polyvalent metal to said lower polyvalent valence state.

12. A method according to claim 11 wherein:
said cellulose ether is sodium carboxymethyl cellulose;
said polyvalent metal compound is sodium dichromate; and
said reducing agent is sodium hydrosulfite.

13. A method according to claim 9 wherein:
said formation is of nonuniform permeability and comprises at least one zone of relatively high permeability and at least one zone of relatively low permeability; and
said fluid medium is injected into said formation subsequent to having injected a drive fluid into said formation via said injection well in said fluid drive process for driving said oil to said production well.

14. A method according to claim 13 wherein said aqueous gel comprises water to which there has been added:
from 0.025 to 1 weight percent of said cellulose ether, based upon the weight of said water;
from 0.5 to 30 weight percent of said polyvalent metal compound based upon the weight of said cellulose ether; and
from 0.5 to at least about 150 percent of the stoichiometric amount of said reducing agent required to reduce said polyvalent metal to said lower polyvalent valence state.

15. A method according to claim 14 wherein:
said cellulose ether is sodium carboxymethyl cellulose;
said polyvalent metal compound is sodium dichromate; and
said reducing agent is sodium hydrosulfite.

16. A method according to claim 1 wherein:
said method comprises a method for drilling a said borehole into the earth;
a drill bit is actuated in said borehole in contact with said formation and penetrates same in the presence of said fluid medium; and
said fluid medium, together with formation solids entrained therein, is removed from said borehole.

17. A method according to claim 16 wherein said aqueous gel comprises water to which there has been added:
from 0.0025 to 20 weight percent of said cellulose ether, based upon the weight of said water;
from 0.05 to 60 weight percent of said polyvalent metal compound based upon the weight of said cellulose ether; and
from 0.1 to at least about 200 percent of the stoichiometric amount of said reducing agent required to reduce said polyvalent metal to said lower polyvalent valence state.

18. A method according to claim 17 wherein:
said cellulose ether is sodium carboxymethyl cellulose;
said polyvalent metal compound is sodium dichromate; and
said reducing agent is sodium hydrosulfite.

19. A method according to claim 4 wherein said aqueous gel comprises water to which there has been added:
from 0.01 to 5 weight percent of said cellulose ether, based upon the weight of said water;
from 0.05 to 60 weight percent of said polyvalent metal compound, based upon the weight of said cellulose ether; and
from 0.1 to at least about 150 weight percent of the stoichiometric amount of said reducing agent required to reduce said polyvalent metal to said lower polyvalent valence state.

20. A method according to claim 19 wherein:
said compound of a polyvalent metal is a compound of chromium wherein the valence of the chromium is +6 and the valence of at least a portion of said chromium is reduced to +3.

21. A method according to claim 20 wherein:
said cellulose ether is sodium carboxymethyl cellulose;
said polyvalent metal compound is selected from the group consisting of sodium dichromate, potassium dichromate, and mixtures thereof; and
said reducing agent is selected from the group consisting of sodium hydrosulfite, potassium hydrosulfite, sodium thiosulfate, sodium metabisulfite, potassium metabisulfite, and mixtures thereof.

22. A method according to claim 9 wherein said aqueous gel comprises water to which there has been added:
from 0.025 to 1 weight percent of said cellulose ether, based upon the weight of said water;
from 0.5 to 30 weight percent of said polyvalent metal compound, based upon the weight of said cellulose ether; and
from 0.5 to at least about 150 percent of the stoichiometric amount of said reducing agent required to reduce said polyvalent metal to said lower polyvalent valence state.

23. A method according to claim 22 wherein:
said cellulose ether is a carboxymethyl cellulose ether;
said polyvalent metal compound is selected from the group consisting of sodium dichromate, potassium dichromate, and mixtures thereof; and
said reducing agent is selected from the group consisting of sodium hydrosulfite, potassium hydrosulfite, sodium thiosulfate, sodium metabisulfite, potassium metabisulfite, and mixtures thereof.

24. A method according to claim 16 wherein said cellulose ether is a carboxymethyl cellulose ether.

25. A method according to claim 24 wherein said aqueous gel comprises water to which there has been added:
from 0.025 to 1 weight percent of said cellulose ether, based upon the weight of said water;
from 0.05 to 60 weight percent of said polyvalent metal compound, based upon the weight of said cellulose ether; and
from 0.1 to at least about 150 weight percent of the stoichiometric amount of said reducing agent required to reduce said polyvalent metal to said lower polyvalent valence state.

* * * * *

UNITED STATES PATENT OFFICE

CERTIFICATE OF CORRECTION

Patent No. 3,727,687　　　　　　　　　　　　　　Dated: April 17, 1973

It is certified that error appears in the above-identified patent and that said Letters Patent are hereby corrected as shown below:

Column 17, line 68, after "state" insert --- per gram of said cellulose ether ---.

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents